3,321,363
MICROBICIDAL METHODS AND COMPOSITIONS CONTAINING IODOCYANOACETYLENE
Anthony A. Sousa, Raleigh, N.C., assignor to Union Carbide Corporation, a corporation of New York
No Drawing. Filed Feb. 2, 1966, Ser. No. 524,458
4 Claims. (Cl. 167—22)

The present invention relates to novel microbicidal compositions. More particularly, the invention relates to compositions comprising iodocyanoacetylene and to the use of such compositions for the control of microorganisms such as bacteria, fungi and nematodes.

There are a wide variety of soil-borne microorganisms which adversely affect plant growth. Their control has been rendered difficult not only by the the limited knowledge of the nature of these microorganisms but also by several practical requirements. To have any utility, the formulation employed must have low phytotoxicity at the effective application rate and it should also have low phytotoxicity at substantially higher application rates to provide a margin of safety in the event that an overdosage is applied to the soil by equipment failure of miscalculation. The cost of an effective amount of the formulation must obviously be justified by its beneficial effect. Moreover, it is desirable that the formulation be susceptible to application without the need for special handling requirements, application conditions or equipment.

Unfortunately, most of the compounds which are known as microbicides lack practical utility because they do not meet one or more of the foregoing requirements. Of those that remain, the microbicidal activity either is limited to a relatively small number of the undesirable microorganisms or is only moderate over a broad range.

We have now found that novel compositions comprising iodocyanoacetylene have excellent microbicidal activity against a wide range of organisms at economical applications rates while also having low phytotoxicity allowing a wide margin of plant safety.

Iodocyanoacetylene is a known compound which can be prepared in accordance with the method described by Kloster and Jensen in Acta Chemica Scandinavica, 17, 1859–61 (1963). Although iodocyanoacetylene is a white powdery material under ordinary conditions, it slowly sublimes. By virtue of this property the novel compositions of this invention provide fumigating action in the soil and yet, in contrast to the fumigants in present use, no special conditions and/or equipment are necessary for application.

The choice of the particular carrier used in conjunction with the iodocyanoacetylene is not critical and the carrier can be either liquid or solid. Suitable liquid carriers include water, petroleum distillates or other liquid carriers which may be used with or without surface active agents. Liquid concentrates can be prepared by dissolving the active compound with a solvent such as toluene, xylene or kerosene and dispersing the toxicant in water with the aid of suitable surface active dispersing agents. The choice of dispersing and emulsifying agent and the amount employed is dictated by the nature of the composition and the ability of the agent to facilitate the dispersion of of the toxicant compound. Dispersing and emulsifying agents which may be employed include the condensation products of alkylene oxides with phenols and organic acids, alkylaryl sulfonates, complex ether alcohols, mahogany soaps, sodium, potassium or calcium alkylaryl sulfonates, and quaternary ammonium compounds.

In the preparation of wettable powder or dust compositions, the active ingredient is dispersed in and on a finely divided inert solid carrier such as clay, talc, chalk, bentonite, fullers earth, and the like. In the formulation of the wettable powders the aforementioned dispersing agents can also be included.

The concentration of iodocyanoacetylene in the microbicidal compositions is not narrowly critical. When a liquid carrier is employed, the concentration of iodocyanoacetylene will generally range from about 5 percent to about 50 percent by weight of the final formulation whereas concentrations of from about 0.5 to 95 percent by weight can be effectively employed when a solid carrier is used. In general, the optimum concentration of the iodocyanoacetylene to be employed in any given formulation must be determined in view of the efficiency with which the equipment used for application can uniformly scatter the formulation over the area to be treated.

The microbicidal compositions can be applied according to methods known to those skilled in the art. Spraying or dusting techniques can be used effectively. It is preferred that the surface soil be turned over following application thereto.

The application rate, i.e. the amount of formulation applied per acre, is dependent upon the concentration of iodocyanoacetylene in the formulation. In general, the application rate should be such that from about 0.25 to 50 pounds, preferably from 5.0 to 10.0 pounds, of the iodocyanoacetylene ingredient will be uniformly distributed per acre.

The compositions of this invention have a broad range of biological activity and are particularly effective in the control of soil bacteria, fungi and nematodes. This activity is demonstrated in the following examples which are intended to be illustrative of the invention rather than limiting it in any way. In each example results are given for the iodocyanoacetylene composition and for a proprietary reference microbicide composition which was tested according to the same procedure.

Unless otherwise indicated, "parts" refers to parts by weight of the applied formulation.

*Example I*

A formulation was prepared by dissolving 0.62 gram of the test compound in 25 milliliters of acetone in which had been dissolved 0.062 gram (10 percent by weight of test compound) of an alkylphenoxy polyethoxyethanol surfactant, as an emulsifying or dispersing agent. The resulting solution was mixed with enough water to provide a stock suspension containing 5,000 parts per million of test compound. Serial dilution tests were then carried out by diluting the stock suspension with water to the test compound concentration indicated in Table I. Nutrient agar was prepared by dissolving 8 grams of nutrient broth and 15 grams of agar in 1000 milliliters of distilled water. This medium was divided into 18 milliliter aliquots in 50 milliliter Erlenmeyer flasks which were then autoclaved for 20 minutes, and allowed to cool to between 50° C. and 60° C. Two milliliters of the test solution, obtained by diluting the stock suspension to the indicated concentration, were then added to the flasks. The contents of the flask were agitated and immediately poured into sterile Petri plates. After solidification of the agar, one transfer loop of a bacterial colony, prepared by culturing the test organism on nutrient agar for one week at a controlled temperature of 20° C., was gently streaked on the agar surface and the inoculated agar was incubated at 20° C. for two days. After this time, the ability of the test compound to inhibit bacterial or fungal growth was visually rated on a relative basis of 1 (no control) to 5 (complete inhibition). The results are set forth in Table I below.

TABLE I

| Concentration of test compound in test solution in p.p.m. | Colonial Inhibition Rating | | | | | | | | | |
|---|---|---|---|---|---|---|---|---|---|---|
| | Bacteria | | | | | Fungi | | | | |
| | Sa [1] | Bac [2] | Pa [3] | Cm [4] | Lac [5] | Fus [6] | Asp [7] | Pen [8] | Pull [9] | Sac [10] |
| Iodocyanoacetylene: | | | | | | | | | | |
| 250 | 5 | 5 | 5 | 5 | 5 | 5 | 5 | 5 | 5 | 3 |
| 60 | 5 | 5 | 5 | 5 | 3 | 5 | 5 | 5 | 5 | 3 |
| Reference Standards | | | | | | | | | | |
| Hexachlorophene [2,2'-methylene bis(3,4,6-trichlorophenol)]: | | | | | | | | | | |
| 250 | 5 | 5 | 3 | 1 | 5 | | | | | |
| 60 | 5 | 5 | 1 | 1 | 5 | | | | | |
| Copper 8-(copper 8-hydroxyquinolinolate): | | | | | | | | | | |
| 250 | | | | | | 5 | 5 | 5 | 5 | 5 |
| 60 | | | | | | 3 | 3 | 5 | 3 | 3 |

[1] *Staphylococcus aureus.*
[2] *Bacillus mesentericus.*
[3] *Pseudomonas aeruginosa.*
[4] *Corynebacterium michiganse.*
[5] *Lactobacillus plantarum.*
[6] *Fusarium gladioli.*
[7] *Aspergillus oryzae.*
[8] *Penicillium digitatum.*
[9] *Pullularia sp.*
[10] *Saccharomyces cerevisiae.*

*Example II*

Pythium sp. or *Sclerotium rolfsii*, as indicated in Table II, below, were cultured on a corn meal-sand medium composed of 600 parts by volume of enriched corn meal, 700 parts by volume of thoroughly washed white sand and 500 parts by volume of deionized water. The cultured medium was sliced into ¾ inch cubes and autoclaved for 30 minutes at 15 p.s.i.g. in glass containers. One week old cultures were then used to infect the culture medium cubes. About 950 cubic centimeters of culture medium cubes were then thoroughly mixed with one flat of sterile soil and the thus-inoculated soil was transferred to 4-inch clay pots. Serial dilution tests were then carried out by drenching each pot with 75 milliliters of test solution which had been prepared by the method described in Example I.

The treated pots were then covered with aluminum foil to prevent drying of the soil and incubated for 2 days at 70° F. and 96% relative humidity. Following the incubation period the pots were seeded with 15 pea seeds, as an indicator crop, and then returned to the incubator for 7 days after which time a count was made of the number of seedlings that had germinated in each pot. The effectiveness of each test compound at each concentration was rated according to the following designations:

5=90 to 100% germination
4=70 to 89% germination
3=50 to 69% germination
2=25 to 49% germination
1=0 to 24% germination The results of the tests were then graphically plotted to determine the effective dosage (ED), in pounds per acre, of each test compound required to provide ratings of 3 and 4.5. Table II, below, sets forth the results of these determinations.

TABLE II

| | Pythium | | Sclerotium | |
|---|---|---|---|---|
| | $ED_3$ | $ED_{4.5}$ | $ED_3$ | $ED_{4.5}$ |
| Iodocyanoacetylene | 5 | 8 | 7 | 12 |
| "Mylone" * | 38 | >75 | 31 | 55 |

*Technical grade 3,5-dimethyl-1,3,5-2H-tetrahydrothiadiazine-2-thione manufactured by Union Carbide Corporation.

*Example III*

Corn meal sand culture medium cubes were prepared as described in Example II, infected with one week old culture of *Phytophthora nicotianae* and mixed with sterile soil in the same proportions as were used in Example II. Serial dilution tests were then carried out by thoroughly mixing 5 milliliters of test solutions, which had been prepared by the method described in Example I, with approximately 290 cubic centimeter portions of the inoculated soil in glass jars. The glass jars containing the mixture were then incubated at 74±2° F. for 48 hours. The contents of the jars were thereafter transferred to 3½ inch clay pots and three tobacco seedlings, 1 to 3 inches tall, were planted in each pot. The plants were sprinkled lightly with water and allowed to stand at room temperature for 24 hours prior to being transferred to a greenhouse where they were kept for 7 days. The number of surviving plants in each pot were then counted and the effectiveness of each test compound at each concentration was rated according to the following designations:

5=90 to 100% stand
4=70 to 89% stand
3=50 to 69% stand
2=25 to 49% stand
1=0 to 24% stand The effective dosage of each test compound was determined as described in Example II and is set forth in Table III, below.

TABLE III

| | $ED_3$ | $ED_4$ |
|---|---|---|
| Iodocyanoacetylene | 16 | 28 |
| Mylone | 75 | >150 |

*Example IV*

The procedure employed in Example III was followed except that the test organism was *Fusarium oxysporium* f. *lycopersici* and 6 three-week old tomato seedlings were planted in each pot as the test plants. Results were taken three to four weeks later and each test was rated according to the same scheme used in Example III. The effective dosage of each test compound was determined to be as shown in Table IV, below.

TABLE IV

| | $ED_3$ | $ED_{4.5}$ |
|---|---|---|
| Iodocyanoacetylene | 27 | 46 |
| Mylone | 300 | |

Example V

Infective migratory larvae of the root-knot nematode (*Meloidogyne incognita*, var. *acrita*) reared on roots of Coleus plants constituted the test organism. Infected plants were removed from the culture and the roots were chopped very finely. A small amount of these choppings were added to a pint glass jar containing approximately 180 cubic centimeters of soil. The jar was capped and incubated for one week at room temperature. During the incubation period eggs of the nematode hatch and the larval forms migrate into the soil. Serial dilution tests were then carried out by thoroughly mixing 10 milliters of several test solutions, which had been prepared as described in Example I, with the contents of each jar. After being allowed to stand for 48 hours, the contents of the jars were transferred to 3-inch clay pots and were seeded with cucumber as an indicator crop. The pots were then held at uniform conditions in a green-house for approximately 3 weeks after which time the cucumber plants were taken from the pots and the roots were rated for galling according to the following designations:

5=no galling; perfect control
4=very light galling
3=light galling
2=moderate galling
1=severe galling, equal to untreated plants.

Table V, below, sets forth the effective dosage (ED), in pounds per acre, of each of the test compounds to provide ratings of 3 and 4.5.

TABLE V

|  | $ED_3$ | $ED_{4.5}$ |
|---|---|---|
| Iodocyanoacetylene | 3 | 7 |
| "Nemagon" * | 10 | 30 |

*A formulation of 1,2-dibromo-3-chloropropane manufactured by Shell Development Company

Example VI

This example illustrates the fumigant fungicidal activity of iodocyanoacetylene formulations.

An aqueous suspension of *Aspergillus niger* conidia was sprayed over both sides of several discs (5 centimeters diameter) of Vienna bread containing no preservative. To assume moisture equilibration, the bread discs were then placed in a plastic bag for three hours. A piece of filter paper was placed in the bottom of each of several 235 milliliter incubation chambers and each was moistened with 1 milliliter of water to maintain high humidity suitable for fungal growth. A bread disc was then placed in each incubation chamber near, but not in contact with, a waxed paper weighing cup containing the amount of iodocyanoacetylene or "Mylone" indicated in Table VI, below. The incubation chambers were sealed and held at 26° C. for one week after which time the fungal growth was rated according to the following scheme:

5=no growth
4=slight growth
3=moderate growth
2=heavy growth
1=no control

The ratings obtained are set forth in Table VI under the designation "Dry Test."

A second series of tests were carried out in like manner except that 0.5 milliliter of water was added to each weighing cup containing the iodocyanoacetylene or Mylone. The ratings obtained from this series of tests are set forth in Table VI under the designation "Wet Test."

TABLE VI

| Milligrams of Test Compound per Incubation Chamber | Iodocyanoacetylene | | Mylone | |
|---|---|---|---|---|
|  | Dry Test | Wet Test | Dry Test | Wet Test |
| 125 | 5 | (¹) | 1 | (¹) |
| 60 | 5 | 5 | 1 | 5 |
| 10 | 5 | 5 | 1 | 5 |
| 5 | 5 | 5 | 1 | 5 |
| 0.4 | 5 | 5 | 1 | 2 |
| 0.1 | 5 | (¹) | (¹) | (¹) |

¹ Not tested.

Example VII

To illustrate the contact and fumigant toxicity of iodocyanoacetylene to *Panagrellus redivivus*, a saprophytic nematode, the following tests were carried out.

One half milliliter of a suspension containing at least 50 test organisms per milliliter was added to each of 4 watch glasses which were so positioned on a petri dish that 3 watch glasses were equally spaced around the other. One tenth milliliter of a test solution which had been prepared in the manner described in Example I and which had the concentration of test compound indicated in Table VII was also added to each watch glass. The petri dishes were then covered, sealed and incubated for 24 hours at 80±2° F. A wide field binocular microscope was then used to examine the watch glasses and the results of the tests were visually rated according to the following designations:

5=excellent kill
3=moderate kill
1=little or no kill

The ratings of these tests are set forth in Table VII under the designation "Contact Test."

A second series of tests were carried out in like manner except that test formulation was added only to the centrally located watch glass. Thus, to be effective, the test compound must be sufficiently volatile to reach the nematodes in the peripherally located watch glasses. The ratings obtained in this series of tests are set forth in Table VII under the designation "Fumigant Test."

TABLE VII

| Concentration of test compound in parts per million parts of test solution | Contact Test | Fumigant Test |
|---|---|---|
| Iodocyanacetylene: | | |
| 1,000 | 5 | 5 |
| 100 | 5 | 5 |
| Zinophos* | | |
| 1,000 | 5 | 3 |
| 100 | 5 | 1 |

*O,O-diethyl-O-(2-pyrazinyl)phosphorothioate.

What is claimed is:

1. A method of combating microorganisms which comprises applying an effective amount of iodocyanoacetylene thereto.

2. A method as claimed in claim 1 in which the iodocyanoacetylene is applied to soil which is infested with microorganisms.

3. A method as claimed in claim 2 in which the iodocyanoacetylene is applied to the soil as a formulation comprising from about 0.5 percent to about 95 percent by weight of iodocyanoacetylene and a carrier therefor.

4. A microbicidal composition comprising iodocyanoacetylene and a finely-divided inert solid pulverulent carrier therefor, the composition containing from about 0.5 percent to about 95 percent by weight of iodocyanoacetylene.

References Cited by the Examiner

Chem. Abstracts, vol. 60, p. 2747b, (1964).

References Cited by the Applicant

UNITED STATES PATENTS 3,084,202   4/1963   Tomita.
3,113,068   12/1963  Wotiz.
3,212,963   10/1965  Wehner.

ALBERT T. MEYERS, *Primary Examiner.*

STANLEY J. FRIEDMAN, *Assistant Examiner.*